April 3, 1973　　　　H. N. MILLS　　　3,725,022
METHOD OF FEEDING GLASS BATCH

Filed Feb. 12, 1971　　　　　　　　　2 Sheets-Sheet 1

INVENTOR.
HARRY N. MILLS
BY HENRY E. ROLL
E.J. Holler, D.T. Innis &
R.F. Rywalski
ATTORNEYS United States Patent Office 3,725,022
Patented Apr. 3, 1973

3,725,022
METHOD OF FEEDING GLASS BATCH
Harry N. Mills, Toledo, Ohio, and Henry E. Roll, Waco, Tex., assignors to Owens-Illinois, Inc.
Filed Feb. 12, 1971, Ser. No. 114,917
Int. Cl. C03b 3/00
U.S. Cl. 65—27                                   7 Claims

ABSTRACT OF THE DISCLOSURE

Method and apparatus for controllably and homogeneously combining and controllably feeding preselected amounts of a homogeneous blended mass of liquid and dry glass batch materials into a glass melting furnace. The foregoing is effected by the use of a mixing and feeding device which employs a paddle blade mixing and conveying device which communicates with a screw conveyor device in a common chamber into which the liquid and dry materials are independently introduced.

BACKGROUND OF THE INVENTION

Figure 1:
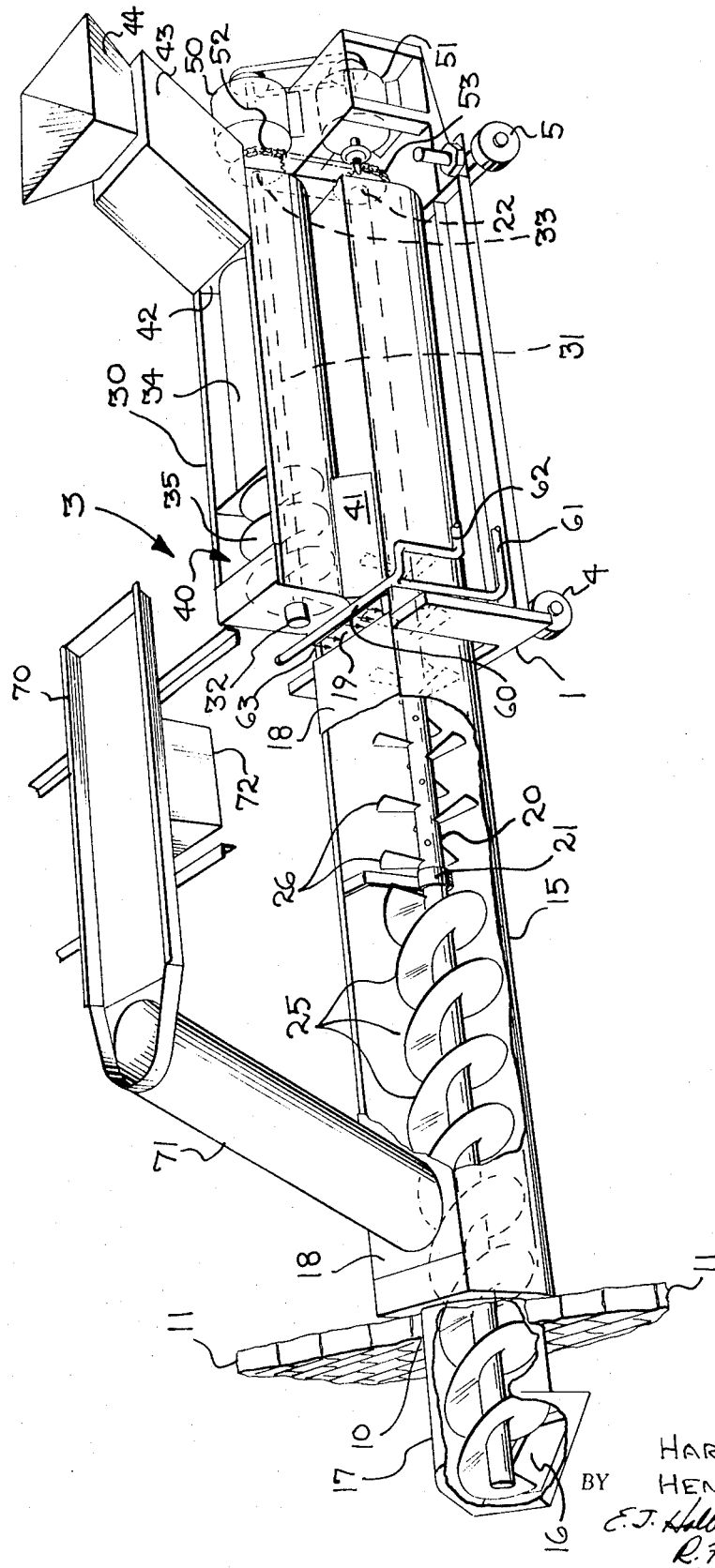

This invention relates to glass manufacturing and, more particularly, the invention relates to techniques for charging glass forming batch ingredients into a glass melting furnace.

The advantages of using a wet batch for melting in glass furnaces are well known. U.S. Pats. 3,081,180 and 3,149,983 are directed toward introduction of a liquid component to the dry batch material. U.S. Pat. 3,234,034 is particularly directed toward the use of an aqueous solution of sodium hydroxide as a liquid component. Some of the advantages potentially obtainable on a commercial scale by the use of these wet batches include a decrease in batch dust emissions from the furnace flue, a slower rate of erosion of the furnace regenerators due to decreased batch dusting, a longer life for the furnace refractory lining, again due to decreased batch dusting, and the formation of a higher quality of glass by a reduction in seed formation.

Desirable as wetted batch may be in theory, in practice such a material has proven extremely difficult to handle in large quantities, i.e., the quantities required if a wet batch is to be employed on a commercial scale in the glass industry. One of the most severe problems in this regard is the tendency for the wet batch to cake, thereby causing extreme difficulty in feeding it in a controlled manner. Another serious problem is the tendency of the wetted batch to form an extremely hard material or "set-up" in its storage bin, thereby making removal of the material from the storage bin extremely difficult.

Several proposals have been made to overcome these problems, such as those disclosed in U.S. Pats. 3,294,555 and 3,081,180 and British Pats. 1,172,318 and 1,173,777. However, these plans require rather precise temperature control of the wetted batch or a relatively complex and expensive intermediate step in the preparation of a suitable wetted batch.

The present invention solves the prior art problems and allows the use of wetted batch with all of its advantages without the necessity of temperature control or a complex intermediate step. The present invention overcomes the problems by homogeneously combining, mixing and conveying the liquid and dry components only moments, for example, less than 30 minutes, usually less than 3 minutes, and, most typically, about one minute, before feeding the admixed materials directly into the melting furnace. That is, the total time lapse between the initial combination of the respective liquid and dry or solid materials to the time of discharge into the furnace is extremely short.

SUMMARY OF THE INVENTION

The present invention provides a method and apparatus for controllably supplying a liquid material, for example, an aqueous medium, and a solid, particulate, dry material which, when combined, define a glass forming batch, to a special mixing and conveying unit and then directly to a glass melting furnace. The mixing and conveying unit includes a paddle blade section into which the materials are initially added and a screw conveyor section which is supplied with the combined materials from the paddle section. The paddle section vigorously agitates and thoroughly admixes the liquid and dry components while conveying the materials toward the screw conveyor section. The screw conveyor section receives a substantially uniform, homogeneous mixture of liquid and dry components, a so-called "wet-batch," and conveys the mixture through the glass furnace wall for discharge while also providing a supplementing gentle mixing motion. This supplemental, or complimenting, mixing motion not only insures that the uniformity of the mixture created by the paddle section will not be disturbed prior to direct discharge into the furnace but also provides additional mixing action when and if it is required. The apparatus and method of this invention have made possible the complete and uniform mixing of liquid and dry glass batch materials in a relatively short period of time and in a relatively confined area. These factors of time and space allow mixing the liquid and dry components as they are fed into the glass melting furnace and have thus made "wet-batch" feeding for glass furnaces both economical and simple, goals which have eluded the art.

Figure 2:
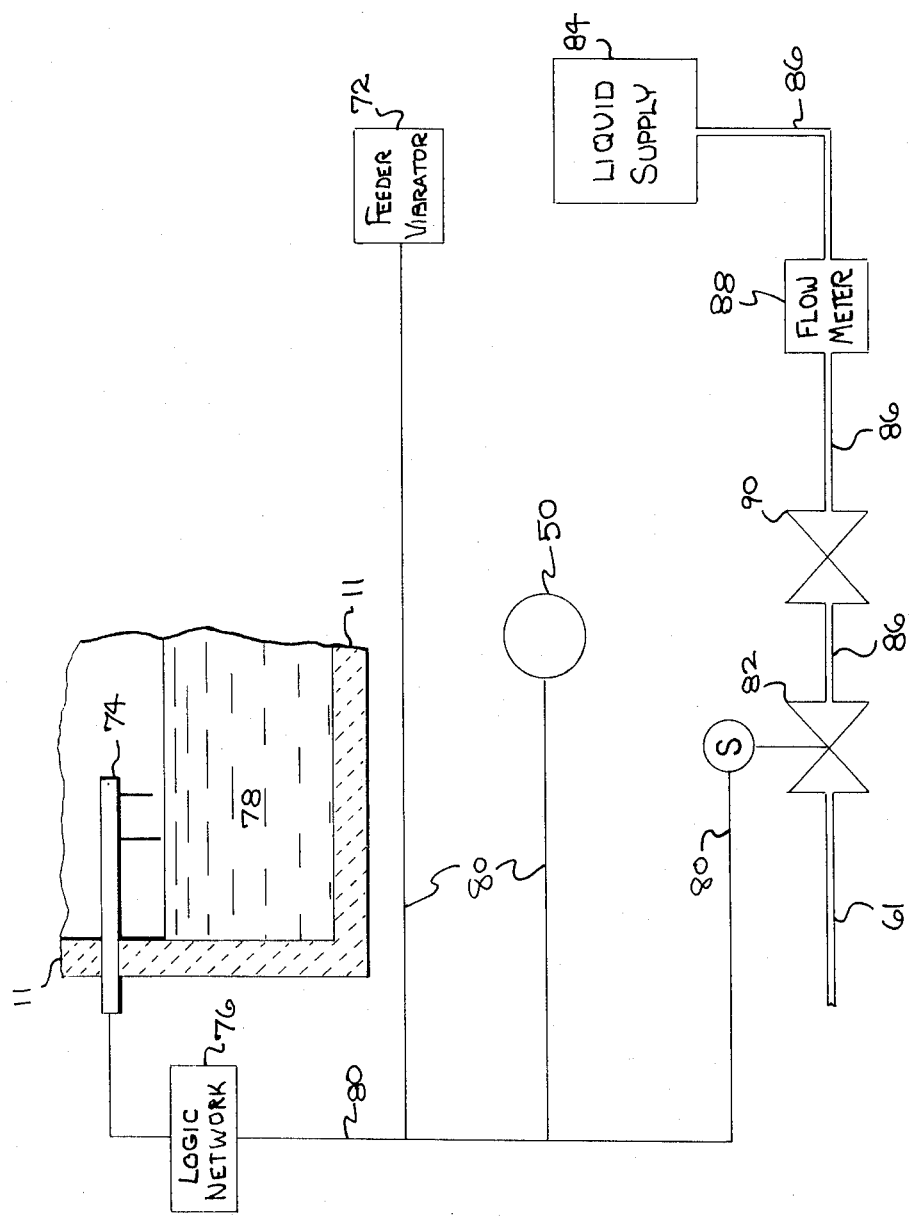

In the drawings:
FIG. 1 is a partially cut-away perspective view of an embodiment of the invention.
FIG. 2 is a diagrammatic view of the control system for feeding the liquid component.

As shown in the drawings:
Referring to FIG. 1, there is generally shown a wall 11 of a glass melting furnace with an aperture 10 therein adapted to receive a portion of the feeding apparatus of the invention. The feeding apparatus, generally designated at 3, is mounted on a frame 1, which is supported by wheels 4 and 5. The feeding apparatus 3 is thus easily movable, or retractable, from the furnace aperture 10 for repair or replacement. Carried by frame 1 is a horizontally disposed, generally U-shaped channel 15 having a substantial length relative to its width with an outlet end 16 protruding through the aperture 10 of the furnace wall 11. Outlet end 16, internally of the wall 11, is provided with a suitable water cooling jacket 17 through which water is circulated, by means not shown, to protect it from the heat within the furnace. Channel 15 may be covered throughout its length by a cover plate 18.

Generally centrally, and horizontally, disposed in the channel 15 is a rotatable shaft 20, supported by suitable conventional bearings at 21 and 22, which extends the entire length of the channel 15. There are generally two distinct sections to shaft 20. Adjacent the outlet end 16 of channel 15 is a section of helical screw flights 25 coaxially carried by shaft 20 and in tandem alignment with the screw flights 25, upstream thereof and also carried by shaft 20, is a section of inclined paddle flights 26. As hereinbefore indicated, the paddle flights section 26 initially admixes the liquid and dry materials with an intense mixing action and simultaneously conveys the material to the screw flights 25. The screw flights 25 then receive the admixed material and provide a polishing mixing action while controllably conveying the material to the furnace for direct discharge. Most advantageously, the paddle flights 26 comprise a plurality of individual fan-shaped paddles whose longitudinal axes are substantially perpendicular to the longitudinal axis of the shaft 20 and whose transverse axis is advantageously set at an angle of between about 35 and 55 degrees with respect to this shaft axis. Preferably, however, the angle is between about 40 and 50 degrees, with an extremely desirable angle being about 45 degrees. In a preferred embodiment, the paddle flights section 26 of the shaft 20 has 12 individual fan-shaped paddles evenly spaced along the length of the shaft 20 at an angular spacing about shaft 20 of about 120 degrees with respect to one another. The screw flights section 25 of shaft 20, in a preferred embodiment, is a continuous screw of constant pitch, e.g., 12 inches. Advantageously, the ratio of the length of the paddle flights section 26 to the screw flights section 25 of shaft 20 is between 0.7 to about 1; preferably, however, the ratio is from about 0.8 to 0.9, with an extremely desirable ratio being about 0.85 to 0.87. Under the operating conditions of a preferred embodiment, the average total residence time of the liquid and dry components in the two sections of the shaft 20 before being fed into the furnace is advantageously less than 5 minutes, preferably less than 3 minutes, and, most desirably, the residence time will be between about one and one-half (1½) and about one (1) minute.

Also carried by frame 1 and disposed upwardly of, and generally parallel to, channel 15 is a generally U-shaped dry material feeding and metering channel 30. A rotatable, horizontal shaft 31, supported by suitable bearings at 32 and 33, extends the length of feeding and metering channel 30, the shaft generally being centrally located therein. Feeding and metering channel 30 is also covered throughout a portion of its length by an arcuate cover plate 34. A series of helical screw flights 35 are carried by and extend the length of shaft 31, thereby serving as a metering means for controlling the feed of dry material into the channel 15. At the outlet end 40 of feeding and metering channel 30, there is provided a connecting shroud 41 which directs and confines materials being fed from feeding and metering channel 30 into an inlet opening formed in the cover plate 18 of the channel 15. Opposite outlet end 40 of feeding and metering channel 30 is an inlet end 42 into which is discharged a mixture of solid glass forming constituents (dry batch material). Suitable means for discharging these constituents includes a hopper 44 and a shroud 43 which communicatingly connects the hopper 44 to inlet end 42. The screw flights 35 are of a constant pitch, e.g., 6 inches.

Shafts 20 and 31 are driven by suitable means such as a motor 50 through a gear box 51 and a pair of chain driven sprockets 52 and 53 mounted on the shafts 31 and 20 respectively.

As dry batch material falls through shroud 41, as suitable, preselected quantity of liquid is introduced thereto by way of a generally horizontal spray device 60. The liquid, from a suitable supply, is introduced under pressure to a pipe 61 which is in turn connected to the spray device 60. Spray device 60 is in the form of a pipe having a plurality of downwardly directed holes 63 drilled therein. The downwardly directed holes 63 preferably extend the entire length of that portion of spray device 60 which overlies an elongated opening 19, formed in the cover plate 18, that extends across substantially the entire width of channel 15. Thus, the dry batch material which falls down shroud 41 into channel 15 comes into contact with the mixing and conveying actions of the paddle flights 26 and the liquid material is evenly discharged and distributed by the downwardly directed holes 63 upon and into the dry material.

Spray device 60 may be connected to a source of compressed gas, for example, compressed air, by means of a conduit 62. Of course, suitable valves are employed on pipe 61 and conduit 62 to preclude an undesirable entry of one of the streams into the other. The purpose of the compressed air is to provide a means for maintaining the spray device 60 and, more specifically, downwardly directed holes 63, in an unobstructed condition. Thus, when the feed of a liquid through pipe 61 is discontinued, the air may be injected into spray device 63 through conduit 62 and thereby dislodge any material clogging downwardly directed holes 63. Uniformity of discharge from downwardly directed holes 63 will thus be assured.

It is common practice in the preparation of glass batch materials to add a quantity of cullet thereto. Cullet is an extremely abrasive material, and if it were to be fed into feeding and metering channel 30 with the rest of the dry batch components, the screw flights 35 would quickly be worn away and lose their metering accuracy. Thus, cullet, if employed, is advantageously introduced into channel 15 at a point closely adjacent its outlet or discharge opening 16. A suitable location is just before the combined wet and dry components are fed through the furnace wall, for example, 1 to 4 feet therefrom. This will also minimize the extent of cullet contact with screw flights 25. Thus, as generally shown in FIG. 1, cullet may be fed from a conventional vibratory feeder 70, with its vibrating drive or motor 72 being activated by a glass level sensing system, as generally seen in FIG. 2. The vibratory feeder 70 may be supported by any suitable means (not shown). Cullet, vibrating along and off feeder 70, then drops into a suitable chute 71 connected to and communicating with channel 15, whereby it is dropped and discharged into the screw flights 25. Screw flights 25, in turn, will mix the cullet into the homogeneous liquid-dry batch mixture and convey the resultant mass directly into the melting furnace.

Upon demand, as for example a signal provided from a glass level sensing system in a melting furnace, motor 50 is turned on, thus rotating shafts 20 and 31. Dry batch material is fed from a suitable source (not shown) into channel 30 through shroud 43 from hopper 44. Each revolution of shaft 31 (and screw flights 35) displaces a precisely controlled amount of dry batch material which falls through shroud 41 into channel 15. It should be recognized that in order for the metering system to function properly, the shroud 43 must always contain a sufficient supply of batch material.

For a further understanding of this invention, reference may now be had to the diagrammatic representation of FIG. 2. In FIG. 2, the level of molten glass 78 in a glass melting furnace having walls 11, is controlled by a level sensor, such as that disclosed in U.S. Pat. 2,645,749, which comprises a level probe 74 and a logic network 76. Level probe 74 senses the level of molten glass 78 in the furnace and transmits an appropriate signal to the logic network 76. The logic network 76 then, in turn, will activate the respective drive mechanisms of the batch feeding system in an on and off fashion depending on the rise or fall of the level of the glass 78 as sensed by the level probe 74. In addition to activating these drive mechanisms, i.e., main motor 50 and vibrator motor 72, the logic network also serves to operate a suitable liquid feed control system by which appropriate amounts of liquid are supplied to spray device 60 through pipe 61. As generally represented in FIG. 2, the liquid material is supplied to pipe 61 from a main liquid supply tank 84 by suitable pipes 86. As the liquid flows through pipe 86 from the supply tank 84, it, in order, passes through a flow measuring meter 88, to a needle flow control valve 90 and finally to a solenoid valve 82. As will be readily apparent, needle flow control valve 90 is adjustable and is used to regulate and control the quantity of liquid introduced to pipe 61 with the quantity of liquid being measured by the flow measuring meter 88. Thus, in operation, the on-off signal from logic network 76 is transmitted by suitable electrical wire means 80 to the motor 50, to the vibrator motor 72 (when employed) and to the solenoid valve 82. Solenoid valve 82, of course, stops and starts the flow of the liquid batch component. When motor 50 is on, thereby driving and rotating shafts 20 and 31, valve 82 is also on, or open, thereby allowing the liquid component to flow to and through the pipe 61. Conversely, when logic network 76 turns off the motor 50, the solenoid valve 82 is also closed or turned off, thereby stopping liquid flow to pipe 61. The same signal also operates the vibrator motor 72 in an on-off manner. It should be noted that, although the apparatus is operated in an intermittent fashion, it is important, the cycle being so adjusted, that the admixed liquid and dry material not be allowed to remain in channel 15 for a period exceeding 30 minutes; all material that enters channel 15 must be fed into the glass melting furnace within 30 minutes from the time of entry into channel 15 to avoid having the admixed material attain a state which makes it extremely difficult to handle.

As will be readily apparent from the foregoing, the apparatus and method of this invention provide a novel technique for admixing a liquid material and a dry, generally particulate material and then conveying this admixed or wet material to the discharge end 16 of the apparatus of this invention whereby it is directly discharged into the melting furnace and melted in a known manner. One important consideration, therefore, resides in the fact that the composition of the wet materials discharged through end 16 into the furnace must, of course, contain the appropriate amounts of necessary batch ingredients to form the desired molten glass. While an ingredient, or any part thereof, may be added via the liquid stream or in the dry material, it will be appreciated that the combination of the liquid and dry material defines the composition required to obtain the desired molten glass. Those skilled in the art will readily select and adjust the amounts of material required for this purpose. In short, the desired glass composition is first selected and the amounts of the respective glass forming batch ingredients required to produce this composition are then determined. Inasmuch as cullet, when charged to the batch forming ingredients, will generally be of a composition which is generally the same as that of the molten glass, the needed glass forming batch ingredients are usually either added entirely as dry material, for example, into hopper 44, or are supplied partially as dry material to hopper 44 and partially with the liquid supplied to pipe 61. Of course, if desired, one or more of the ingredients may be entirely added in the liquid. Accordingly, it will be apparent that the liquid stream may be a liquid per se, such as, for example, water or the liquid stream may be an aqueous dispersion or solution containing at least a portion of a necessary batch-forming ingredient. In the latter case, the mixture of batch materials which is supplied in a solid, particulate form to hopper 44 is, of course, compensated to reflect the fact that a batch-forming ingredient, or ingredients, or a portion thereof, is added in the liquid via pipe 61 through spray device 60. In this regard, it should be mentioned that the amount of water added through spray device 60 will be so selected such that the batch, after the vigorous agitation and its being conveyed to discharge opening 16, will contain less than about 12 percent water, e.g., 2 to about 12 percent.

The present invention is especially well adapted for the manufacture of a soda-lime silicate glass wherein the appropriate batch-forming ingredients are discharged through opening 16 into a melting furnace in a wet condition. In short, the batch-forming ingredients charged to the furnace will be an intimate, homogeneous mixture of water and appropriate batch-forming ingredients in such proportion that the moisture content of the wet batch discharged through opening 16 will be in the range of about 2 to 12 percent by weight water, most desirably, about 5 to 11 percent by weight, and a highly preferred water content being about 4 to 6 percent by weight, and the combined wet batch will include the appropriate amounts of glass forming ingredients to produce the desired final glass composition. According to this aspect of the invention, suitable batch-forming ingredients will, thus, be selected such as to yield on a theoretical oxide basis, a molten glass having the following composition in percent by weight:

| | Percent |
|---|---|
| $SiO_2$ | 60–75 |
| $Al_2O_3$ | 0.1–10 |
| $CaO$ | 6–14 |
| $BaO$ | 0–10 |
| $B_2O_3$ | 0–5 |
| $MgO$ | 0–8 |
| $Na_2O$ | 10–20 |
| $K_2O$ | 0–3 |

The appropriate batch ingredients necessary to yield the foregoing composition may all be added to hopper 44 with only water being added through spray device 60 or, if desired, certain of the batch-forming ingredients, or portions thereof, may be added in the liquid stream with the appropriate corrections being made with regard to the amount of dry material supplied to hopper 44.

It is particularly convenient to supply the batch ingredients necessary for the presence, in the final glass, of alkali-metal oxides and/or alkaline-earth metal oxides into the batch in the form of alkali-metal hydroxide solutions or dispersions and/or alkaline-earth metal hydroxide solutions or dispersions. Suitable amounts of these oxides, individually or collectively, supplied in the form of hydroxides, may be between about 75% to about 95%, or even higher, with the remaining amount being added as a dry material.

In a particularly preferred embodiment of this invention the soda ($Na_2O$) required in the ultimate glass is at least partially supplied in the form of an aqueous NaOH solution. The concentration of this solution will be conveniently selected, for example, 25%, 50% or 75% NaOH solutions, but it is generally preferred to use the higher concentration solutions, that is, those generally in excess of about 50% NaOH. In the usual practice of this feature of the invention, at least about 75%, e.g., 75% to 95% or higher, of the $Na_2O$ of the final molten glass composition will be supplied to the furnace in the form of NaOH and less than about 25%, e.g., 5% to 25%, of the $Na_2O$ of the final molten glass composition will be supplied in the form of solid sodium carbonate into hopper 44. In an especially highly preferred embodiment of this invention, it being known that some soda will be added as an impurity with other batch-forming ingredients, substantially all, for example, at least 98 or 99% of the soda ($Na_2O$) requirements for the molten batch are satisfied by the addition of the soda in the form of an aqueous sodium hydroxide solution.

In order to more fully describe an embodiment of this invention, there is set forth an example below wherein a portion of the soda requirement was supplied to hopper 44 in the form of sodium carbonate, a major proportion, however, being supplied in the form of a liquid, aqueous, caustic solution to spray device 60. Dry particulate glass-forming batch ingredients were supplied to metering screw 35 through shroud 43 and hopper 44. It is, of course, recognized that sufficient material must be discharged into hopper 44 in order for the metering screw 35 to function properly. In actual operation, an oversupply of material to shroud 43 and hopper 44 is generally preferred to thereby insure the controlled metering of the appropriate dry materials via screw flights 35. Specifically, the dry material which was supplied in this matter was a mixture of the materials set forth below in the indicated weight amounts.

|  | Pounds |
|---|---|
| Sand | 1320.0 |
| Soda ash | 76.8 |
| Limestone | 38.6 |
| Salt cake | 9.8 |
| Blast furnace slag | 44.4 |
| Nepheline syenite | 152.8 |
| A-1-Z decolorizer | 1.2 |

A-1-Z decolorizer is a known agent for decolorizing glass and generally has a composition of about 1.15 percent selenium, about 0.23 percent cobalt oxide, about 45.9 percent sodium nitrate, about 22.9 percent arsenic, and about 29.8 percent feldspar. The liquid material which was added to pipe 61, and then discharged through the holes 63 of spray device 60, was a 50 percent aqueous sodium hydroxide solution. Screw flights 35 were pre-calibrated to meter a controlled amount of 80.5 lbs. per minute of the solid particulate mixture described above and needle flow control valve 90 was similarly adjusted to supply a controlled amount of about 1.6 lbs. per minute of the sodium hydroxide solution to spray device 60. When operating in this mode, the moisture content of the soda-lime silicate glass-forming batch composition, discharged through opening 16 directly into the melting furnace, was about 10 percent water.

From the foregoing discussion, it will be readily apparent that the mode of operation was therefore generally as follows. As the level of molten glass 78 in the melting furnace was depleted by glass consumption, probe 74, through the logic network 76 activated motor 50 and substantially simultaneously therewith opened solenoid valve 82. With the activation of motor 50, shafts 32 and 20 were rotated. With the rotation of shaft 32, the screw flights 35 conveyed a precisely controlled amount, to wit, 80.5 lbs. per minute, of the solid, particulate materials to shroud 41 wherein the materials were discharged into the paddle flights 26 carried by shaft 20. Into this dry material, the 50 percent caustic solution was also added as a result of the opening of solenoid valve 82 and, therefore, the caustic solution was dispensed through holes 63 into these substantially dry solid materials at the rate of about 1.6 lbs. of solution per minute. The paddle flights 26 then vigorously admixed and combined the liquid and dry ingredients and substantially simultaneously conveyed the homogeneously admixed material to the section containing the helical screw flights 25. These helical screw flights 25 then picked up the material supplied thereto from the paddle section and continued to agitate the material while simultaneously conveying the material in a generally helical path to discharge 16 whereby a homogeneous wet batch containing approximately 10 percent by weight of water was discharged directly into the glass melting furnace. The average total retention time (from the time of discharge to the paddles to the time of discharge from the helical screws to the furnace) was about 2 minutes. This mode of operation is continued until the level of molten glass 78 in the furnace has increased and the probe 74 now responds to deactivate motor 50, thereby ceasing the rotation of shafts 31 and 20 respectively, and also serving to close solenoid valve 82, whereby the flow of caustic solution is discontinued. This experiment was run for a prolonged interval and it was found that the material discharged to the furnace was of a very uniform, homogeneous nature. No plugging or set-up problems were encountered and the full benefits of employing a wet batch charge to the molten glass furnace were realized.

While the foregoing describes the present invention with particularity, it will, of course, be readily apparent that modifications are possible. Accordingly, and in accordance with the patent statutes and laws, the scope of the present invention is as described in the following claims.

We claim:

1. A method for providing a wetted glass forming batch to a glass melting furnace comprising the steps of:
   (a) sensing the level of molten glass in said furnace;
   (b) generating a control signal in response to the fall of the level of molten glass in said furnace below a pre-selected minimum level;
   (c) metering controlled quantities of a mixture of solid, particulate glass forming ingredients into a generally horizontally disposed, generally U-shaped channel having a discharge end located within said glass melting furnace in response to said control signal;
   (d) substantially simultaneously therewith, adding a liquid containing water to said solid ingredients in said channel at a controlled rate in response to said control signal, the composition of said liquid and said solid ingredients in combination defining said wetted glass forming batch, the amount of water added in said liquid being sufficient to form a wet mass having about 2 to about 12 percent water by weight;
   (e) rotating a plurality of spaced paddle blades located in said channel in a generally vertical direction about the longitudinal axis of said channel in response to said control signal;
   (f) admixing said liquid and solid ingredients in said channel by contact with said rotating paddle blades;
   (g) simultaneously with said admixing, conveying the admixed mass away from the point of addition of said liquid and solid ingredients by the action of said paddle blades;
   (h) rotating a plurality of helical screw flights located in said channel adjacent said paddle blades in a generally vertical direction about the axis of said channel in response to said control signal;
   (i) transferring said admixed mass from said paddle blades to said helical screw flights;
   (j) conveying said admixed mass with said helical screw flights toward the discharge end of said channel;
   (k) discharging said admixed mass directly from said helical screw flights into said glass melting furnace;
   (l) terminating said control signal in response to the rise of the level of molten glass in said furnace above a pre-selected maximum value;
   (m) ceasing the feed of said liquid and solid ingredients and the rotation of said paddle blades and said helical screw flights in response to the termination of said control signal; and
   (n) repeating steps (a) through (m).

2. The method of claim 1 wherein said liquid also contains an alkaline metal hydroxide or alkaline earth hydroxide or a mixture thereof.

3. The method of claim 2 wherein said liquid is an aqueous NaOH solution.

4. The method of claim 3 wherein said mixture of solid particulate ingredients includes sodium carbonate and wherein at least about 75% of the soda requirement of said glass is supplied in the form of NaOH.

5. The method of claim 3 wherein the amount of water added as an aqueous NaOH solution produces a wet mass containing about 5 to about 11% water.

6. The method of claim 4 wherein substantially all of the soda requirement of said glass is supplied in the form of NaOH.

7. The method of claim 1 wherein the time lapse between step (a) and step (m) is less than about 30 minutes.

References Cited
UNITED STATES PATENTS

| | | | |
|---|---|---|---|
| 3,081,180 | 3/1963 | Krinov | 106—52 |
| 3,234,034 | 2/1966 | Jasinski et al. | 106—52 X |
| 3,451,831 | 6/1969 | Miche | 65—335 X |
| 3,542,534 | 11/1970 | Yamamoto | 65—335 X |

ARTHUR D. KELLOGG, Primary Examiner

U.S. Cl. X.R.

65—134, 160, 335; 106—DIG. 8; 214—18 G D